Patented Sept. 27, 1932

1,879,562

UNITED STATES PATENT OFFICE

EDWARD W. SMITH, OF PHILADELPHIA, PENNSYLVANIA

PROCESS OF MANUFACTURING STORAGE BATTERY SEPARATORS

No Drawing. Original application filed April 2, 1929, Serial No. 352,047. Divided and this application filed April 21, 1930. Serial No. 446,194.

This application is a division of my application, Serial Number 352,047, filed April 2, 1929.

An object of my invention is to produce an improved storage battery separator having a long life because it is composed of materials inert both to the action of the electrolyte of the battery and to the oxidizing effect of the active material of the positive plate.

Another object of my invention is to produce a separator having sufficient porosity to permit the diffusion of electrolyte through the pores of the separator and to permit the passage of electric current between the plates.

A further object of my invention is to produce a separator having pores sufficiently minute to prevent particles of active material, becoming dislodged from the plates, from projecting across from one plate to another to form a short circuit.

Still another object of my invention is to produce a separator having sufficient mechanical strength to be substituted for the wood veneers now customarily used as separators in storage batteries or to be used between such a wood veneer and a positive plate.

One form of my invention consists in applying a mixture of sodium silicate and a siliceous powder (silica), of which preferred example is infusorial earth, to the surface of a sheet of fibrous material inert to both the action of the electrolyte and the oxidizing effect of the positive plate of the storage battery, such as asbestos or glass wool. The mixture of sodium silicate solution with a siliceous powder is made of the consistency of a thick syrup and applied to the surface of the sheet of fibrous material.

When infusorial earth is mixed with aqueous sodium silicate, a partial chemical combination takes place, which results in a setting action very similar to that of cement. When this mass is afterwards treated with sulphuric acid, further chemical reaction takes place, resulting in porous silica, $SiO_2$, and sodium sulphate, the latter soluble in water or dilute sulphuric acid. Owing to the cementing action which has taken place as described, the porous silica which finally results consists of an integral mass having quite an appreciable mechanical strength.

An alternate method of practicing my invention is to amalgamate the fibrous material and the mixture of sodium silicate and siliceous powder into a uniform mix and then roll or otherwise spread out the mix into the form of a sheet and allow it to set.

In either of these methods, after the mixture of sodium silicate and siliceous powder has set and hardened the separator is subject to the action of dilute sulfuric acid which reacts with the sodium silicate. One of the compounds resulting from this reaction is sodium sulfate, which dissolves out, leaving the separator in a porous condition.

I claim:

1. A process comprising, forming a sheet of a fibrous inert material and sodium silicate and a siliceous powder, allowing the sheet to set and harden, treating with sulphuric acid forming sodium sulphate, and dissolving out the resultant sodium sulphate, leaving solid porous silica.

2. A process comprising, making a mixture of a fibrous inert material and sodium silicate and a siliceous powder, forming a sheet of the mixture, allowing the sheet to set and harden, treating with sulphuric acid forming sodium sulphate, and dissolving out the resultant sodium sulphate leaving solid porous silica.

3. A process comprising, forming a sheet of glass wool and sodium silicate and a siliceous powder, allowing the sheet to set and harden, treating with sulphuric acid forming sodium sulphate, and dissolving out the resultant sodium sulphate leaving solid porous silica.

4. A process comprising, making a mixture of glass wool and sodium silicate and a siliceous powder, forming a sheet of the mixture, allowing the sheet to set and harden, treating with sulphuric acid forming sodium sulphate, and dissolving out the resultant sodium sulphate leaving solid porous silica.

5. A process according to claim 1 in which the siliceous powder is infusorial earth.

6. A process according to claim 2 in which the siliceous powder is infusorial earth.

7. A process according to claim 3 in which the siliceous powder is infusorial earth.

8. A process according to claim 4 in which the siliceous powder is infusorial earth.

9. A process comprising forming a sheet of supporting material and sodium silicate and a siliceous powder, allowing the sheet to set and harden, treating with sulphuric acid forming sodium sulphate, and dissolving out the resultant sodium sulphate leaving solid porous silica adhering to said material.

EDWARD W. SMITH.